US010630117B2

(12) United States Patent
Gong et al.

(10) Patent No.: US 10,630,117 B2
(45) Date of Patent: Apr. 21, 2020

(54) ENERGY MANAGEMENT METHOD AND SYSTEM FOR RECEIVING TERMINAL OF SIMULTANEOUS INFORMATION AND ENERGY TRANSFER SYSTEM

(71) Applicant: South University of Science and Technology of China, Guangdong (CN)

(72) Inventors: Yi Gong, Guangdong (CN); Zidong Han, Guangdong (CN)

(73) Assignee: South University of Science & Technology of China, Shenzhen (CN)

(*) Notice: Subject to any disclaimer, the term of this patent is extended or adjusted under 35 U.S.C. 154(b) by 137 days.

(21) Appl. No.: 15/831,001

(22) Filed: Dec. 4, 2017

(65) Prior Publication Data

US 2018/0091004 A1 Mar. 29, 2018

Related U.S. Application Data

(63) Continuation of application No. PCT/CN2015/086141, filed on Aug. 5, 2015.

(30) Foreign Application Priority Data

Jul. 21, 2015 (CN) .......................... 2015 1 0432214

(51) Int. Cl.

*H02J 50/80* (2016.01)
*H04B 1/40* (2015.01)

(Continued)

(52) U.S. Cl.

CPC ............ *H02J 50/80* (2016.02); *H02J 7/0068* (2013.01); *H04B 1/40* (2013.01); *H04B 5/0031* (2013.01);

(Continued)

(58) Field of Classification Search

CPC ...... H04B 1/40; H04B 5/0031; H04B 5/0037; H02J 50/80; H02J 7/0068; H02J 7/345; H04L 5/0044

See application file for complete search history.

(56) References Cited

U.S. PATENT DOCUMENTS 9,608,675 B2 * 3/2017 Dorosenco .............. H04B 1/04
2014/0226748 A1 8/2014 Dorosenco (Continued)

FOREIGN PATENT DOCUMENTS

CN 103346834 A 10/2013
CN 103679224 A 3/2014

(Continued)

OTHER PUBLICATIONS

International Search Report, dated Apr. 25, 2016, for corresponding international application PCT/CN2015/086141.

*Primary Examiner* — Alfonso Perez Borroto
*Assistant Examiner* — Esayas G Yeshaw
(74) *Attorney, Agent, or Firm* — Myers Wolin, LLC

(57) ABSTRACT

An energy management method and system are provided for a receiving terminal of a simultaneous information and energy transfer system. The method comprises the steps of: activating a battery to provide a working power supply, receiving a simultaneous information and energy transfer signal, processing the signal and harvesting energy in the signal, storing the harvested energy into a temporary energy storage unit, and stopping the battery from supplying power, and charging the battery from the energy stored in the temporary energy storage unit. The system comprises a receiver and an energy management module.

10 Claims, 2 Drawing Sheets

Start
Is a signal is dectected passing by?
No
Yes
A battery supplies power
Is the signal a simultaneous information and energy transfer signal?
Yes
Energy processing
Information processing
Storing energy into a capacitor
Does the signal processing end?
Yes
Turning of the battery
The capacitor charges the battery

(51) Int. Cl.
*H04L 5/00* (2006.01)
*H02J 7/00* (2006.01)
*H04B 5/00* (2006.01)
*H02J 7/34* (2006.01)

(52) U.S. Cl.
CPC ......... *H04B 5/0037* (2013.01); *H04L 5/0044* (2013.01); *H02J 7/345* (2013.01)

(56) References Cited

U.S. PATENT DOCUMENTS

| | | | | |
|---|---|---|---|---|
| 2015/0128733 | A1* | 5/2015 | Taylor | H02J 17/00<br>73/865.8 |
| 2015/0241566 | A1* | 8/2015 | Chakraborty | G01S 19/34<br>342/357.74 |
| 2016/0285518 | A1* | 9/2016 | Gong | H04B 5/0037 |
| 2017/0358943 | A1* | 12/2017 | Bocus | H02J 7/0068 |

FOREIGN PATENT DOCUMENTS

| | | | |
|---|---|---|---|
| CN | 104135770 | A | 11/2014 |
| CN | 104734832 | A | 6/2015 |
| CN | 104812078 | A | 7/2015 |
| CN | 104836765 | A | 8/2015 |
| WO | 2014206130 | A1 | 12/2014 |
| WO | 2016149947 | A1 | 9/2016 |
| WO | 2016149948 | A1 | 9/2016 |
| WO | 2016149949 | A1 | 9/2016 |

* cited by examiner

ENERGY MANAGEMENT METHOD AND SYSTEM FOR RECEIVING TERMINAL OF SIMULTANEOUS INFORMATION AND ENERGY TRANSFER SYSTEM

CROSS REFERENCE TO RELATED APPLICATIONS

This application is a continuation under 35 U.S.C. § 120 of International. Application PCT/CN2015/086141, filed Aug. 5, 2015, which claims priority to Chinese Application 201510432214.0, filed Jul. 21, 2015, the contents of each of which are incorporated by reference herein.

FIELD OF THE INVENTION

The present invention relates to an intersection of the wireless communication technology and the wireless power transmission technology, and in particular to an energy management method and system for a receiving terminal of a simultaneous information and energy transfer system.

BACKGROUND

The simultaneous wireless information and energy transfer (i.e., simultaneous transfer of information and energy in a wireless mode) is a new communication technology integrating the wireless communication technology and the wireless energy transmission technology. With the development of science and technology, the integration of the energy technology and the communication technology becomes a trend, which can not only realize a high-speed and reliable communication, but also effectively ease the pressure on scarcity of energy and spectrum, thereby having important application value in industry, medical treatment, infrastructure development, etc.

The simultaneous wireless information and energy transfer breaks through the traditional wireless communication means, takes energy attributes into consideration at the same time and integrates the wireless communication technology with the wireless energy transfer technology, thus enabling a parallel and simultaneous transfer of information and energy and having wide application value and innovation significance.

The simultaneous information and energy transfer may be used in various wireless terminals or devices which rely on batteries of limited capacity for power supply based on its characteristics, and feed the wireless terminals or devices by harvesting energy from signals, thereby greatly prolonging the standby time, decreasing the device volume and cost and reducing the battery throughput significantly. Therefore, the environmental pollution caused during manufacture and recycling of batteries is greatly reduced. Based on the characteristics of non-contact long-distance transmission, the power supplied by batteries or cables can be replaced, and the convenience of the power supply is greatly improved. Based on the characteristics of stability and sustainability, the conventional way of harvesting environmental energy (such as wind energy, solar energy and kinetic energy) by energy harvesters can be replaced. Meanwhile, the simultaneous wireless information and energy transfer is widely applied in the improvement of people's life and brings about great social benefits. In the medical field, there is a serious problem of shortage of battery energy in implanting medical devices such as cardiac pacemakers and cardiovascular robots, the assembly of the simultaneous wireless information and energy transfer technology can protect patients form severe secondary pains.

In the application documents "TRANSMITTING SYSTEM AND RECEIVING SYSTEM FOR MULTICARRIER BROADBAND SIMULTANEOUS INFORMATION AND ENERGY TRANSFER" (Application No. 201510133784.X), "TRANSMITTING METHOD AND RECEIVING METHOD FOR SIMULTANEOUS INFORMATION AND ENERGY TRANSFER" (Application No. 201510133428.8) and "MULTICARRIER BROADBAND SIMULTANEOUS INFORMATION AND ENERGY TRANSFER OPTIMIZATION METHOD" (Application No. 201510133789.2), the inventor(s) has (have) proposed a simultaneous information and energy transfer method, wherein baseband signals transmitted by the system contain information baseband signals and energy baseband signals, which are both simultaneously transmitted after being processed correspondingly, and sufficient electric energy is provided to a receiving terminal through the energy signals. The method can be widely applied in the digital communication and analog communication.

In the above simultaneous information and energy transfer system, if a wireless energy signal is rectified directly to supply power to a receiver, the power output by rectification is unstable due to the time variation of a wireless channel. As a result, it is likely to result in the unstable operation of the receiver and even data loss, more seriously, resulting in power failure of the receiver. Accordingly, the stability and reliability of the system are not ensured effectively, and the popularization and application of the simultaneous information and energy transfer system are influenced.

SUMMARY

To solve the above technical solutions, an objective of the disclosure is to provide an energy management method which can effectively ensure the stable operation of a receiver in a simultaneous information and energy transfer system.

To solve the technical solutions, another objective of the disclosure is to provide an energy management system which can effectively ensure the stable operation of a receiver in a simultaneous information and energy transfer system.

The system and method described employ the following technical solutions.

An energy management method for a receiving terminal of a simultaneous information and energy transfer system is provided, which is applied to a simultaneous information and energy transfer system having a transmitter and a receiver and includes the steps of: S1, activating a battery to provide working power supply for a receiving terminal; S2, receiving, by the receiving terminal, a simultaneous information and energy transfer signal, processing the simultaneous information and energy transfer signal and harvesting energy in the simultaneous information and energy transfer signal; S3, storing the harvested energy into a temporary energy storage unit; and, S4, stopping the batter to supply power, and charging the battery by the energy stored in the temporary energy storage unit.

Preferably, before the step S1, the method further includes the step of: S0, detecting whether a signal is passing by, and proceeding to the step S1 if the signal is passing by.

Preferably, the step S2 specifically includes the sub-steps of: S21, receiving a signal by the receiving terminal; S22; identifying a signal frame header, judging whether the signal is a simultaneous information and energy transfer signal, and proceeding to step S23 if the signal is a simultaneous information and energy transfer signal; and, S23, processing the simultaneous information and energy transfer signal and harvesting energy in the simultaneous information and energy transfer signal.

Preferably, the sub-step S23 specifically comprises the sub-steps of: S231, distributing the simultaneous information and energy transfer signal to form an energy signal and an information signal; S232, processing and harvesting energy of the energy signal, and proceeding to the step S3; and, S233, processing information of the information signal.

Preferably, the temporary energy storage unit is a capacitor or a small-capacity battery.

Preferably, the energy in the simultaneous information and energy transfer signal comprises energy of the energy signal and/or energy of a guard interval signal.

Provided is an energy management system for a receiving terminal of a simultaneous information and energy transfer system, which is used to implement the energy management method for a receiving terminal of a simultaneous information and energy transfer system, wherein the system includes a receiving terminal which includes: a receiver including a receiving antenna and a signal processing unit, the receiving antenna being used for receiving a signal, the signal processing unit being used for judging and processing the signal and harvesting energy in the signal; and, a power management module including a control unit, a temporary energy storage unit and a battery, the control unit being used for controlling the on and off of the battery and controlling the temporary energy storage unit to charge the battery when the battery is an off state, the temporary energy storage unit being used for temporarily storing the energy received by the receiver, the battery being used for providing a working power supply for the receiving terminal.

Preferably, the receiver further includes a signal detection unit for detecting whether a signal is passing by the receiver.

Preferably, the temporary energy storage unit is a capacitor or a small-capacity battery.

Preferably, the energy in the simultaneous information and energy transfer signal comprises energy of the energy signal and/or energy of a guard interval signal.

The disclosed system and method have the following beneficial effects.

In the system and method, by controlling, storing and managing energy received by a receiver, the problems of instantaneous power supply insufficiency and unstable operation of a receiver on a receiving terminal of a simultaneous information and energy transfer system due to time variation of wireless signals are overcome, thereby effectively ensuring the stable operation of the receiver and providing good economic and social benefits.

The disclosure can be widely applied to a variety of information and energy simultaneous transformation systems.

BRIEF DESCRIPTION OF THE DRAWINGS

Embodiments of the invention will be further described in detail with reference to the accompanying drawings, in which.

DETAILED DESCRIPTION OF THE PREFERRED EMBODIMENTS

It is noted that the following embodiments in the application and the features in the embodiments can be combined without any conflict.

In an existing simultaneous information and energy transfer system, if a wireless energy signal is rectified directly to supply power to a receiver, the power output by rectification is unstable due to the time variation of a wireless channel. As a result, it is likely to result in the unstable operation of the receiver and even data loss, more seriously, resulting in power failure of the receiver. Accordingly, the stability and reliability of the system are not ensured effectively. Although the wirelessly received energy may be insufficient to provide the power for the normal operation of the receiver at a certain moment, within a limited period of time, the total wirelessly received energy is sufficient to provide power for the normal operation of the receiver within this period of time. That is, within a limited period of time, the average power received by the wireless receiver is greater than or equal to the power required by the normal operation of the receiver. Based on this idea, the inventors propose an energy management method and system.

Figure 1:
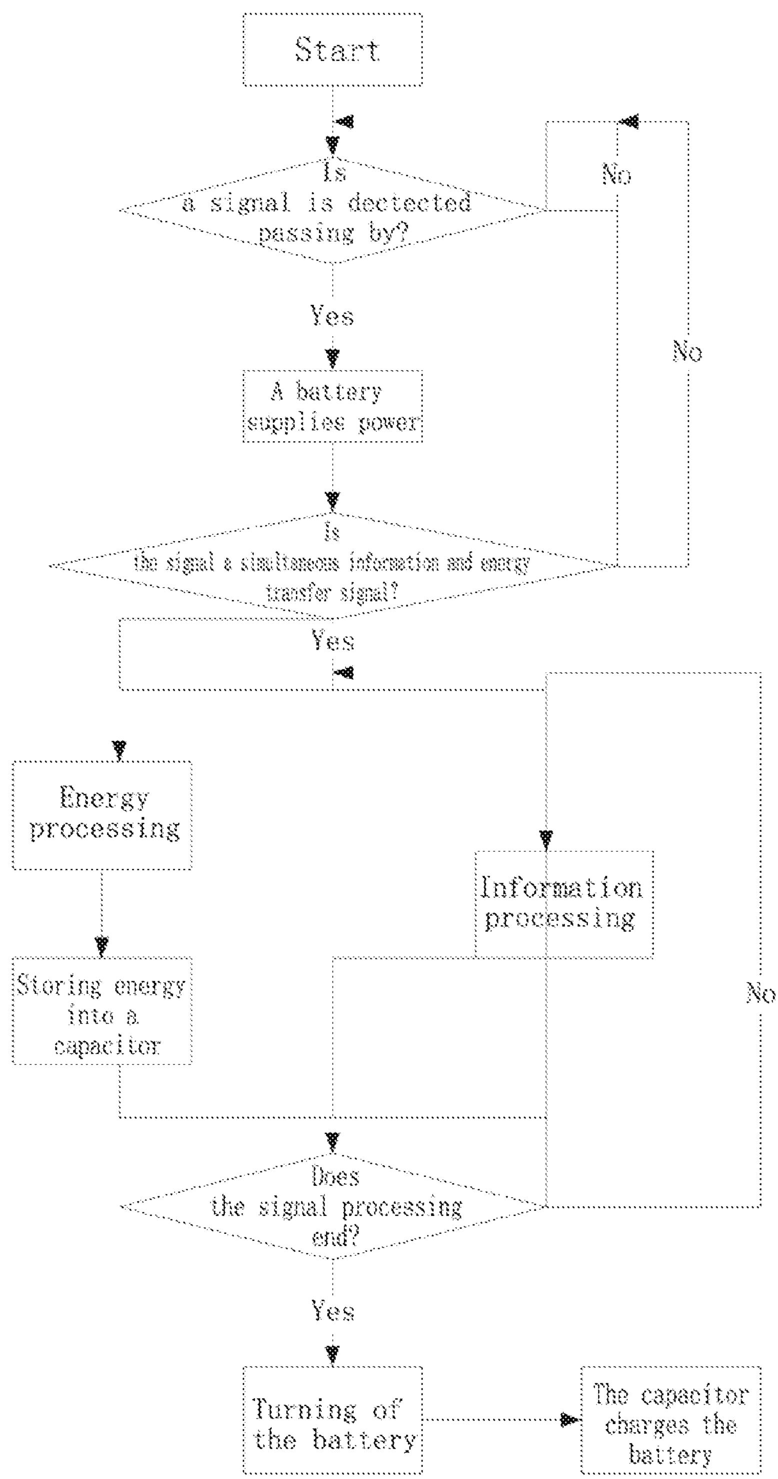
FIG. 1 is a flow diagram in an embodiment of an energy management method according to this disclosure.

As shown in FIG. 1 an energy management method for a receiving terminal of a simultaneous information and energy transfer system is provided, which is applied to a simultaneous information and energy transfer system having a transmitter and a receiver. And the method includes the steps of: S0, detecting whether a signal is passing by, and proceeding to step S1 if the signal is passing by; S1, activating a battery to provide working power supply for a receiving terminal; S2, receiving, by the receiving terminal, a simultaneous information and energy transfer signal, processing the simultaneous information and energy transfer signal and harvesting energy in the simultaneous information and energy transfer signal; S3, storing the harvested energy into a temporary energy storage unit; and, S4, stopping the batter to supply power, and charging the battery by the energy stored in the temporary energy storage unit. In the step S0, a signal detection unit may detect whether a signal is passing by the receiver. When the signal intensity is greater than a set threshold, it is decided that a signal is passing by and the step S1 will be executed. The signal detection unit may be a passive filter.

Preferably, the step S2 specifically includes the sub-steps of: S21, receiving a signal by the receiving terminal; S22; identifying a signal frame header, judging whether the signal is a simultaneous information and energy transfer signal, proceeding to step S23 if the signal is a simultaneous information and energy transfer signal, and returning to the step S0 if the signal is not a simultaneous information and energy transfer signal; and, S23, processing the simultaneous information and energy transfer signal and harvesting energy in the simultaneous information and energy transfer signal.

Preferably, the sub-step S23 specifically comprises the sub-steps of: S231, distributing the simultaneous information and energy transfer signal to form an energy signal and an information signal; S232, processing and harvesting energy of the energy signal, and proceeding to the step S3; and, S233, processing information of the information signal.

In this embodiment, after the energy signal and the information signal are processed, the method further includes the step of: judging whether the signal processing is completed, proceeding to the step S4 if the signal processing is completed, and returning to the step S2 if the signal processing is not completed.

Preferably, the temporary energy storage unit is a capacitor or a small-capacity battery.

Preferably, the energy in the simultaneous information and energy transfer signal comprises energy of the energy signal and/or energy of a guard interval signal.

Figure 2:
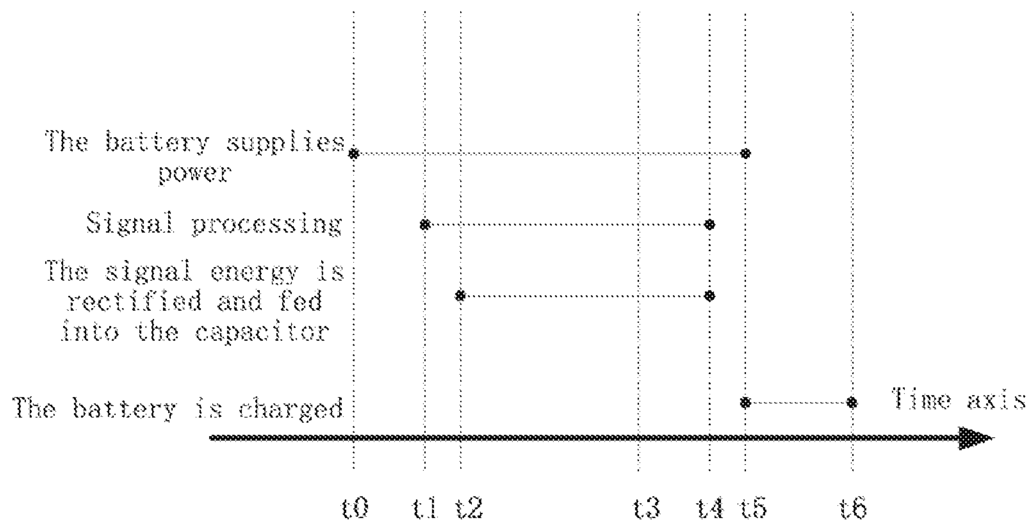
FIG. 2 is a schematic timing diagram of an energy processing period of an embodiment of the energy management method according to this disclosure.

As shown in FIG. 2, in a preferred embodiment, a specific timing flow of the energy management method is as follows.

An energy processing period is divided into six energy management periods, which consist of seven time nodes (t0 to t6).

Actions for the seven time nodes will be described below:

t0: one energy management period starts;

t1: a receiving circuit starts receiving a signal and starts a signal processing process;

t2: a rectifier circuit in the receiver starts working, converts a RF signal into DC current and charges a capacitor;

t3: the signal receiving and processing process is completed;

t4: after the signal processing is completed, the rectification process is also completed;

t5: the power supply stage of the batter ends; and t0: one energy management period ends.

Actions for the six energy management periods are described below:

t0-t1: the battery supplies power for the receiving circuit;

t1-t2: the signal processing starts; rectification of a guard interval, demodulation of the information signal and rectification of the energy signal are included, wherein, at the moment t2, the energy signal in the signal enters a rectifier and is then converted into DC current and fed into a capacitor; and the battery continuously supplies power for the receiving circuit within this period;

t2-t3: the signal processing is completed within t1 to t3, wherein the signal processing within one symbol time includes processing of the information signal and processing of the energy signal; the energy signal is rectified into DC current and fed into the capacitor, and the battery continuously supplies power for the receiving circuit within this period;

t3-t4: after the signal processing is completed, the rectifier converts the remaining energy signal into a DC electric signal; so far, the signal processing and the rectification of the energy signal end;

t4-t5: after the signal processing is completed, the battery stops supplying power for the receiving circuit; and t5-t6: the capacitor begins to discharge to charge the battery.

Figure 3:
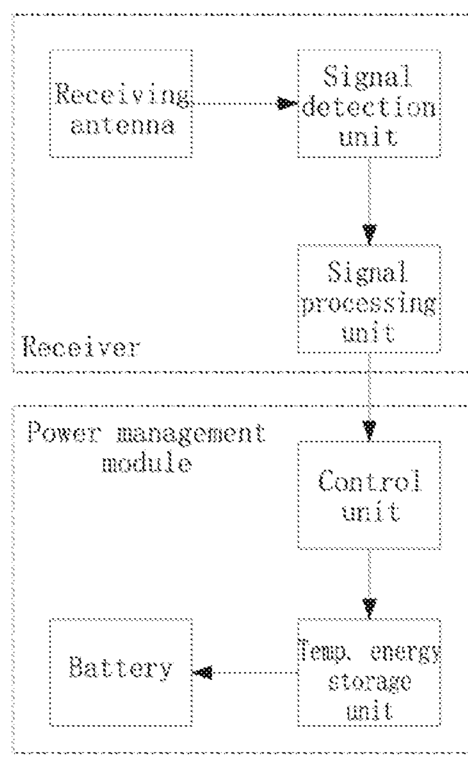
FIG. 3 is a principle block diagram of an embodiment of an energy management system according to this disclosure.

As shown in FIG. 3, an energy management system for a receiving terminal of a simultaneous information and energy transfer system is provided, which is used to implement the energy management method for a receiving terminal of a simultaneous information and energy transfer system, wherein the system includes a receiving terminal which includes: a receiver including a receiving antenna and a signal processing unit, the receiving antenna being used for receiving a signal, the signal processing unit being used for judging and processing the signal and harvesting energy in the signal; and, a power management module including a control unit, a temporary energy storage unit and a battery, the control unit being used for controlling the on and off of the battery and controlling the temporary energy storage unit to charge the battery when the battery is in a charged state, the temporary energy storage unit being used for temporarily storing the energy received by the receiver, the battery being used for providing a working power supply for the receiving terminal.

Preferably, the receiver further includes a signal detection unit for detecting whether a signal is passing by the receiver. A signal detection unit may detect whether a signal is passing by the receiver. When the signal intensity is greater than a set threshold, it is decided that a signal is passing by. In this case, the step S1 will be executed.

Preferably, the temporary energy storage unit is a capacitor or a small-capacity battery. Apparently, the temporary energy storage unit may also be other temporary energy storage units.

Preferably, the energy in the simultaneous information and energy transfer signal comprises energy of the energy signal and/or energy of a guard interval signal.

In the system and method, by controlling, storing and managing energy received by a receiver, the problems of instantaneous power supply insufficiency and unstable operation of a receiver on a receiving terminal of a simultaneous information and energy transfer system due to time variation of wireless signals are overcome, thereby effectively ensuring stable operation of the receiver and providing good economic and social benefits.

The disclosed system and method can be widely applied to a variety of information and energy simultaneous transformation systems.

Although the preferred embodiments of the invention have been specifically described above, the invention is not limited thereto. Those skilled in the art can make various equivalent deformations or replacements without departing from the spirit of the invention, and these equivalent deformations or replacements shall fall into the scope defined by the claims of the application.

What is claimed is:

1. An energy management method for a receiving terminal of a simultaneous information and energy transfer system, which is applied to a simultaneous information and energy transfer system having a transmitter and a receiver, the method comprising:

S1, activating a battery to provide working power supply for a receiving terminal;

S2, receiving, by the receiving terminal, a simultaneous information and energy transfer signal, processing the simultaneous information and energy transfer signal and harvesting energy in the simultaneous information and energy transfer signal;

S3, storing the harvested energy into a temporary energy storage unit; and

S4, stopping the battery from supplying power, and charging the battery by the energy stored in the temporary energy storage unit.

2. The energy management method of claim 1, wherein, before the step S1, the method further comprising the step of:

S0, detecting whether a signal is passing by, and proceeding to the step S1 if the signal is passing by.

3. The energy management method of claim 1, wherein step S2 comprises the sub-steps of:

S21, receiving a signal by the receiving terminal;

S22, identifying a signal frame header, judging whether the signal is a simultaneous information and energy transfer signal, and proceeding to step S23 if the signal is a simultaneous information and energy transfer signal; and S23, processing the simultaneous information and energy transfer signal and harvesting energy in the simultaneous information and energy transfer signal.

4. The energy management method of claim 3, wherein the sub-step S23 specifically comprises the sub-steps of:

S231, distributing the simultaneous information and energy transfer signal to form an energy signal and an information signal;

S232, processing and harvesting energy of the energy signal, and proceeding to the step S3; and S233, processing information of the information signal.

5. The energy management method of claim 1, wherein the temporary energy storage unit is a capacitor or a small-capacity battery.

6. The energy management method of claim 5, wherein the energy in the simultaneous information and energy transfer signal comprises energy of the energy signal or energy of a guard interval signal.

7. An energy management system for the receiving terminal of a simultaneous information and energy transfer system, which is used to implement the energy management method of claim 1, the system comprising a receiving terminal, wherein the receiving terminal comprises:

a receiver comprising a receiving antenna and a signal processing unit, the receiving antenna being used for receiving a signal, the signal processing unit being used for judging and processing the signal and harvesting energy in the signal; and a power management module comprising a control unit, a temporary energy storage unit and a battery, the control unit being used for controlling on and off states of the battery and controlling the temporary energy storage unit to charge the battery when the battery is an off state, the temporary energy storage unit being used for temporarily storing the energy received by the receiver, the battery being used for providing a working power supply for the receiving terminal.

8. The energy management system of claim 7, wherein the receiver further comprises a signal detection unit for detecting whether a signal is passing by the receiver.

9. The energy management system of claim 7, wherein the temporary energy storage unit is a capacitor or a small-capacity battery.

10. The energy management system of claim 9, wherein the energy in the simultaneous information and energy transfer signal comprises energy of the energy signal or energy of a guard interval signal.

* * * * *